(12) United States Patent  
Yamamoto (10) Patent No.: US 9,303,756 B2  
(45) Date of Patent: Apr. 5, 2016

(54) SHIFT DEVICE

(71) Applicant: KABUSHIKI KAISHA TOKAI-RIKA-DENKI-SEISAKUSHO, Aichi-ken (JP)

(72) Inventor: Makoto Yamamoto, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 41 days.

(21) Appl. No.: 14/283,316

(22) Filed: May 21, 2014

(65) Prior Publication Data

US 2014/0345410 A1    Nov. 27, 2014

(30) Foreign Application Priority Data

May 24, 2013    (JP) .................................. 2013-110140

(51) Int. Cl.

| B60K 20/00 | (2006.01) |
|---|---|
| F16H 59/04 | (2006.01) |
| F16H 59/10 | (2006.01) |
| F16H 61/24 | (2006.01) |
| F16H 59/02 | (2006.01) |

(52) U.S. Cl.

CPC .............. *F16H 59/105* (2013.01); *F16H 59/10* (2013.01); *F16H 61/24* (2013.01); *F16H 2059/0273* (2013.01); *F16H 2061/243* (2013.01); *F16H 2061/247* (2013.01); *Y10T 74/2014* (2015.01)

(58) Field of Classification Search

CPC .................... F16H 59/0278; F16H 2059/0269; F16H 2059/026; F16H 2059/0273

See application file for complete search history.

(56) References Cited

U.S. PATENT DOCUMENTS

| 5,522,279 A * | 6/1996 | Kataumi ................ B60K 20/02 74/473.3 |
|---|---|---|
| 6,389,918 B1 * | 5/2002 | Wang .................. F16H 59/0278 74/471 R |
| 7,750,624 B2 | 7/2010 | Heo et al. |
| 2005/0160860 A1 * | 7/2005 | Matsushima ....... F16H 59/0278 74/473.1 |
| 2008/0034913 A1 * | 2/2008 | Takikawa ............ F16H 59/0278 74/473.33 |

FOREIGN PATENT DOCUMENTS

JP    2008-132932    6/2008

* cited by examiner

*Primary Examiner* — William Kelleher  
*Assistant Examiner* — Jake Cook  
(74) *Attorney, Agent, or Firm* — Roberts Mlotkowski Safran & Cole, PC (57) ABSTRACT

A shift device capable of improving positioning accuracy of a center of pivot of a shift lever assembly is provided. The device includes a shift lever plate that is integrally provided with a supporting shaft and a supporting hole, and a shift lever assembly that is integrally provided with the other of the supporting shaft or the supporting hole. The shift lever assembly is supported by the shift lever plate so as to be capable of pivoting by insertion of the supporting shaft into the supporting hole from the axial direction, and operates a vehicle transmission. The shift device further includes a lever guide housing including a pressing tab that has both a pressing portion and a restricting portion engageable with the supporting shaft. When the supporting shaft is pressed by the pressing portion of the lever guide housing, the restricting portion of the pressing tab enters between the supporting shaft and the supporting member so as to restrict movement of the supporting shaft.

6 Claims, 10 Drawing Sheets

SHIFT DEVICE

CROSS-REFERENCE TO RELATED APPLICATION

This application claims priority under 35 USC 119 from Japanese Patent Application No. 2013-110140 filed May 24, 2013, the disclosure of which is incorporated by reference herein.

BACKGROUND

1. Technical Field

The present invention relates to a shift device in which a vehicle transmission is operated by operating an operating member.

2. Related Art

In a shift lever device described in Japanese Patent Application Laid-Open (JP-A) No. 2008-132932, a select rotation shaft of a shift rotation shaft is passed through a shift lever, and the shift lever is thereby supported by the shift rotation shaft so as to be capable of pivoting in a select direction.

Furthermore, a rotation supporting portion of the shift rotation shaft is inserted into a shaft bearing face of a base bracket, and the shift lever is thereby supported by the base bracket so as to be capable of pivoting in the shift direction.

In the shift lever device, the select rotation shaft is assembled to the shift rotation shaft. As a result, the positioning accuracy of the center of pivot of the shift lever toward the select direction is affected by the assembly margin of error of the select rotation shaft to the shift rotation shaft.

Furthermore, the base bracket is configured by assembling an upper side bracket and a lower side bracket, and the shaft bearing face is configured by combining a semicircular arc face of the upper side bracket and a semicircular arc face of the lower side bracket. As a result, the positioning accuracy of the center of pivot of the shift lever toward the shift direction is affected by misalignment when the pair of semicircular arc faces are combined, due to assembly margin of error of the upper side bracket and the lower side bracket.

SUMMARY

In consideration of the above circumstances, an object of the present invention is to obtain a shift device capable of improving positioning accuracy of a center of pivot of an operating member.

A shift device of a first aspect of the present invention is equipped with: a supporting member that is integrally provided with one of a supporting shaft or a supporting hole; and an operating member that is integrally provided with the other of the supporting shaft or the supporting hole, that is supported by the supporting member so as to capable of pivoting by insertion of the supporting shaft into the supporting hole from the axial direction, and that operates a vehicle transmission through operation.

In the shift device of the first aspect, the operating member is supported by the supporting member so as to be capable of pivoting, and the vehicle transmission is operated through operation of the operating member.

One of the supporting shaft or the supporting hole is integrally provided to the supporting member, the other of the supporting shaft or the supporting hole is integrally provided to the operating member, and the supporting shaft is inserted into the supporting hole from the axial direction. Positioning accuracy of the supporting shaft, and positioning accuracy of the supporting hole can thereby be improved, enabling positioning accuracy of a center of pivot of the operating member to be improved.

The shift device of a second aspect is the shift device of the first aspect, further equipped with a detection section that detects a pivoting position of the operating member.

In the shift device of the second aspect, the detection section detects the pivoting position of the operating member. This thereby, as described above, enables the positioning accuracy of the center of pivot of the operating member to be improved, enabling the detection accuracy by the detection section of the pivoting position of the operating member to be improved.

The shift device of a third aspect is the shift device of the first aspect or the second aspect, further equipped with a slide section that slides one of the operating member or the supporting member in the axial direction of the supporting shaft with respect to the other of the operating member or the supporting member such that the supporting shaft is inserted into the supporting hole.

In the shift device of the third aspect, the slide section slides one of the operating member or the supporting member in the axial direction of the supporting shaft with respect to the other of the operating member or the supporting member, and the supporting shaft is inserted into the supporting hole. The supporting shaft can accordingly be easily inserted into the supporting hole.

The shift device of a fourth aspect is the shift device of the third aspect, wherein, by attaching the slide section to the support member, the slide section presses and slides the operating member in the axial direction of the supporting shaft.

In the shift device of the fourth aspect, by attaching the slide section to the support member, the slide section presses and slides the operating member in the axial direction of the supporting shaft. The supporting shaft can thereby be inserted into the supporting hole using a simple configuration.

As explained above, the shift device according to the present invention enables the positioning accuracy of the center of pivot of the operating member to be improved.

BRIEF DESCRIPTION OF THE DRAWINGS

An exemplary embodiment of the invention will be described in detail with reference to the following figures, wherein.

DETAILED DESCRIPTION

Exemplary Embodiment Configuration

Explanation follows regarding a shift lever device 10 as a shift device according to an exemplary embodiment of the present invention, with reference to FIG. 1 to FIG. 10. Note that in FIG. 1 to FIG. 10, an arrow FR indicates to the shift lever device 10 front, an arrow LF indicates to the shift lever device 10 left, and an arrow UP indicates upward of the shift lever device 10. However, the front-rear direction, left-right direction and up-down direction of the shift lever device 10 may be the same as, or may be different to, the respective front-rear direction, left-right direction and up-down direction of a vehicle installed with the shift lever device 10. Moreover, the shift lever device 10 is provided for example to a floor or an instrument panel of a vehicle.

Figure 1:
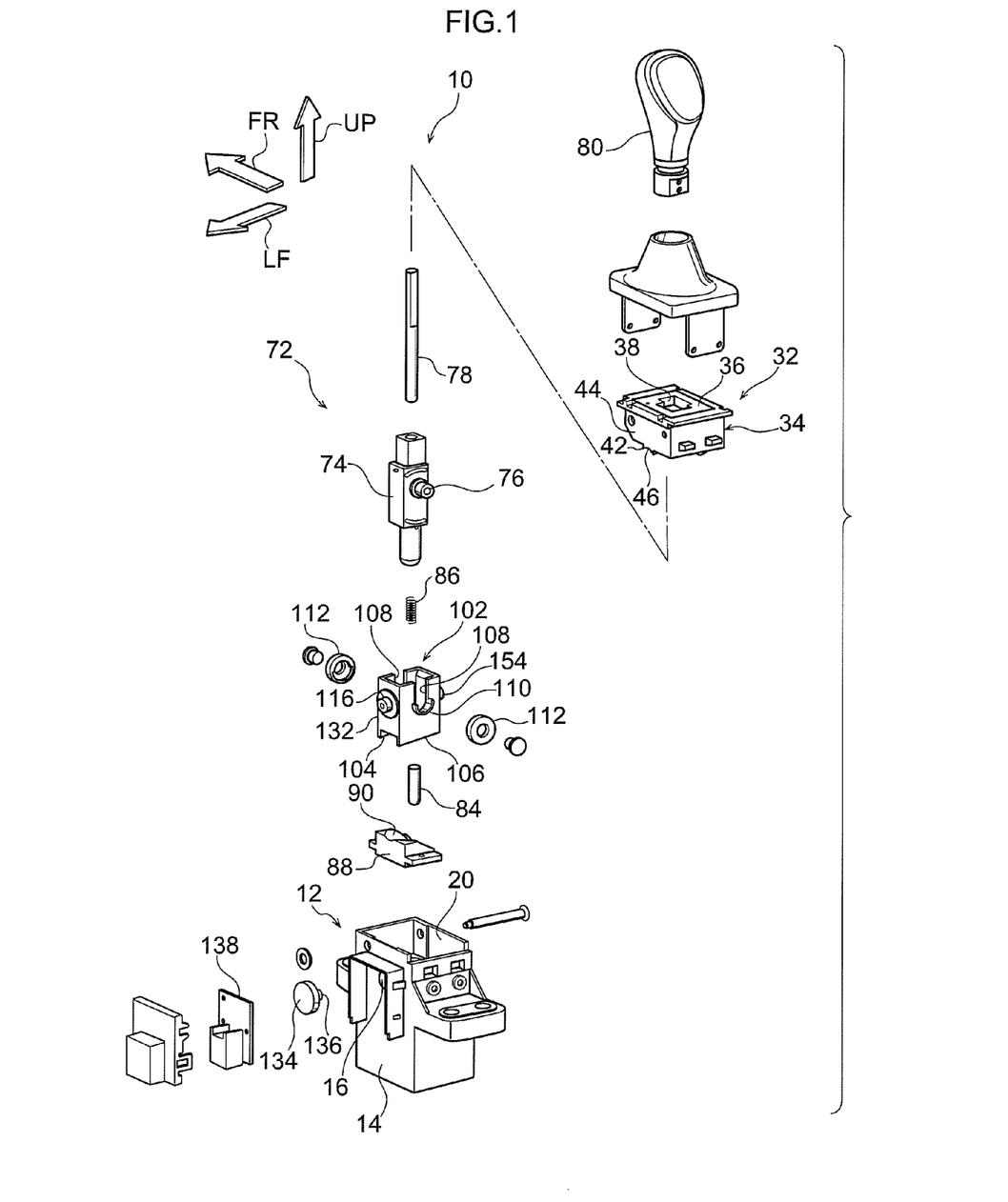
FIG. 1 is an exploded perspective view of a shift lever device according to an exemplary embodiment of the present invention, as viewed from the rear left.
Figure 2:
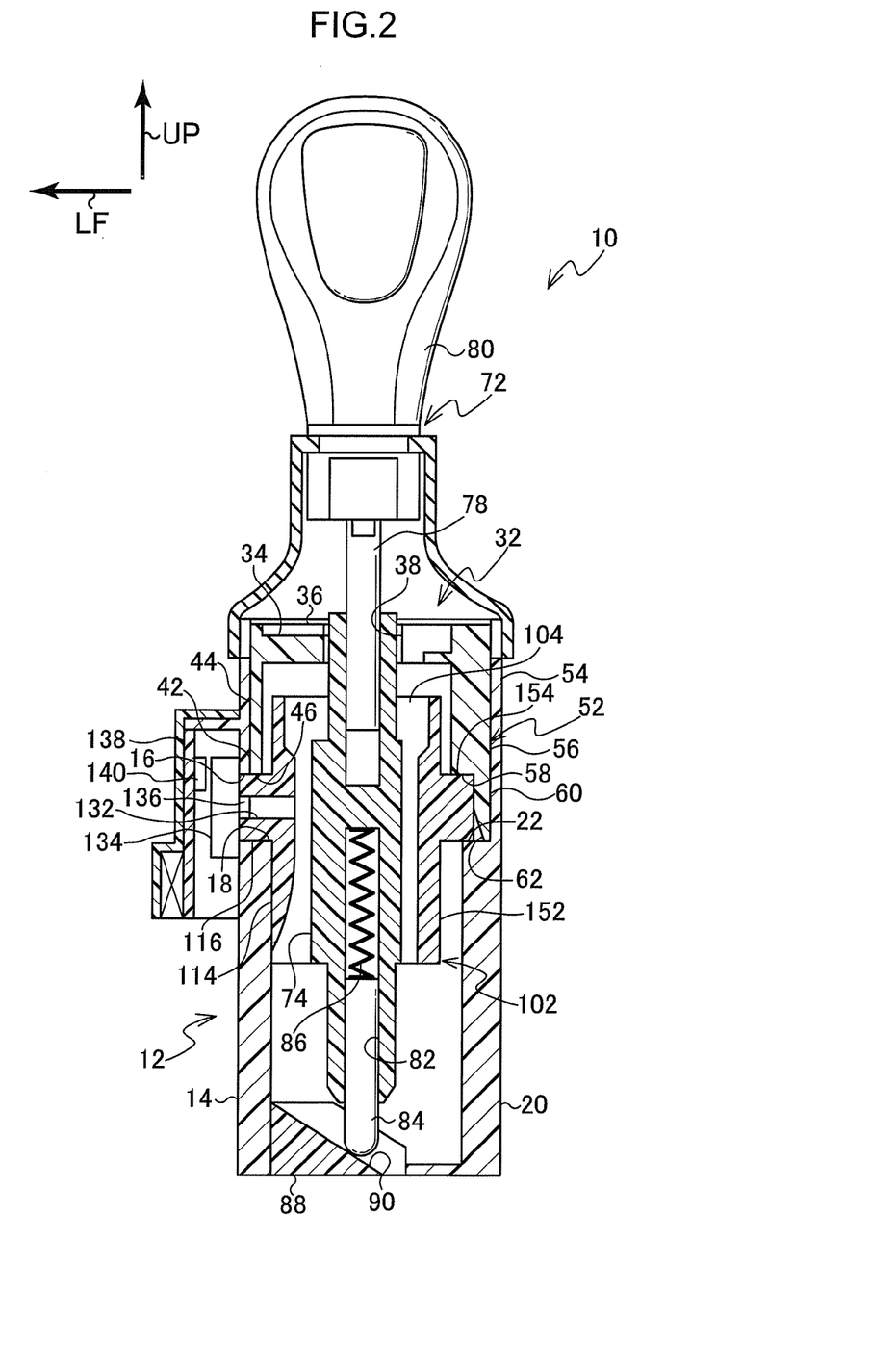
FIG. 2 is a cross-section view of a shift lever device according to the exemplary embodiment of the present invention, as viewed from the rear.

As illustrated in FIG. 1 and FIG. 2, the shift lever device 10 is equipped with a shift lever plate 12 as a supporting member. The shift lever plate 12 is formed as rectangular box shape, and an upper end of the shift lever plate 12 is open. A left wall 14 of the shift lever plate 12 is formed with a lower side that is thicker than an upper side, and a right side face of a thick portion of the left wall 14 is positioned further to the shift lever plate 12 inside than a right side face of a thin portion of the left wall 14. A circular shaped supporting hole 16 is formed to the left wall 14, and the supporting hole 16 passes through the left wall 14 in a state straddling the thick portion and the thin portion of the left wall 14. A portion of the supporting hole 16 further to the right side than the thin portion of the left wall 14 configures a mounting portion 18.

Figure 4:
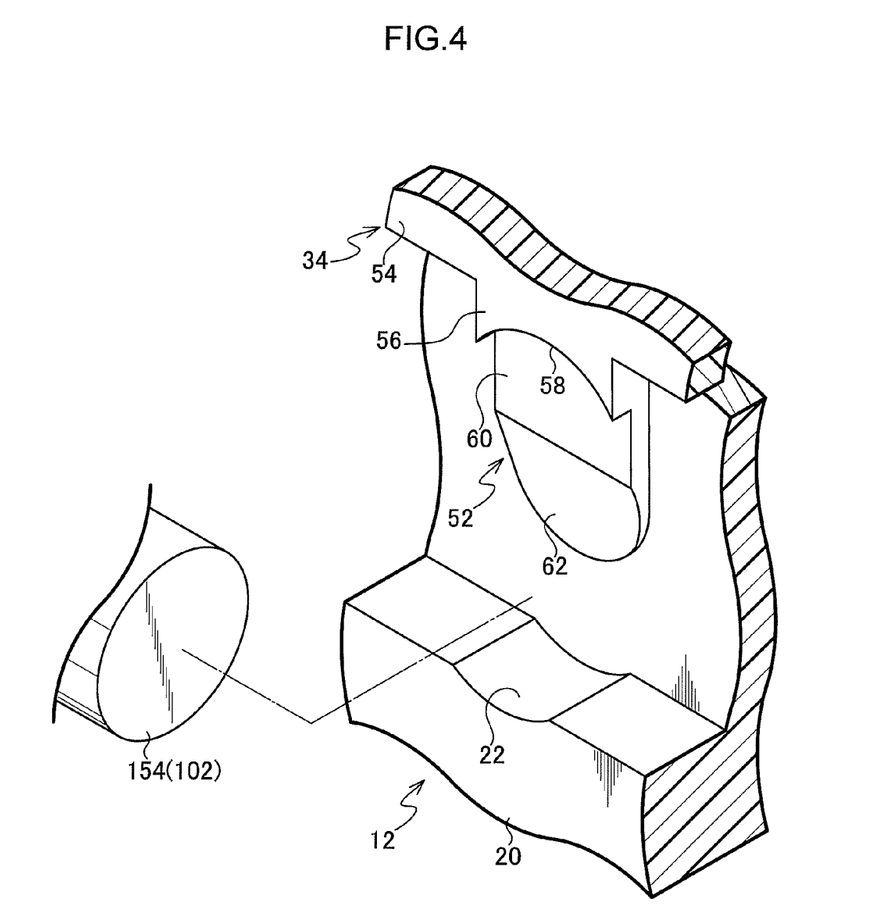
FIG. 4 is an enlarged perspective view of a right side concave portion and slide section.
Figure 5:
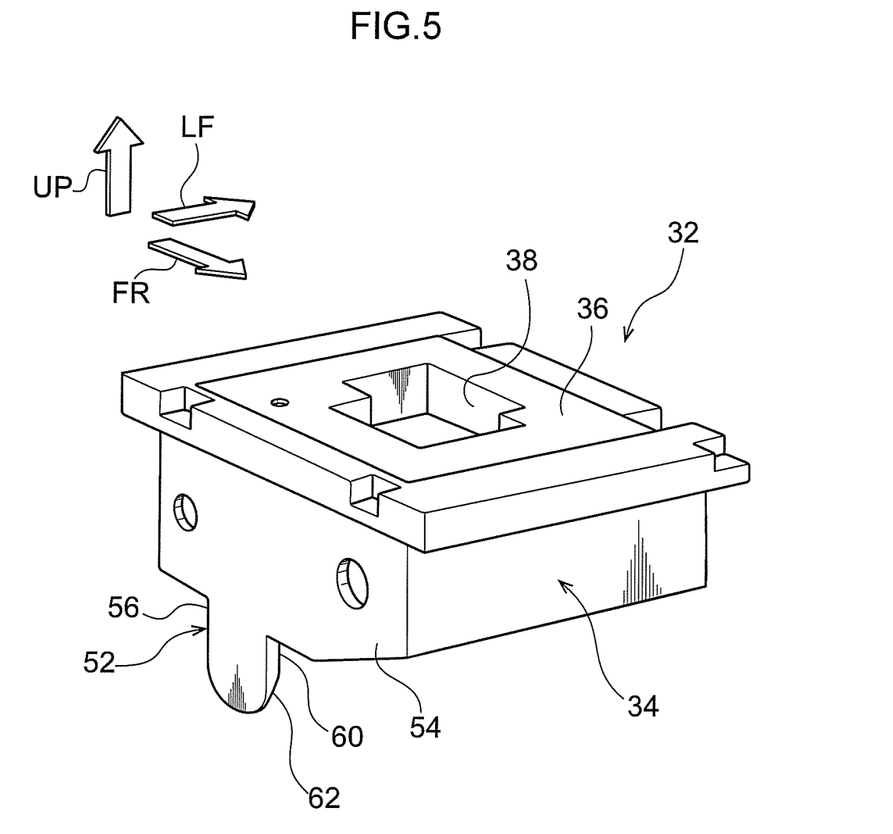
FIG. 5 is a perspective view of a lever guide housing, as viewed from the front right.

A right wall 20 of the shift lever plate 12 is formed with a lower side that is thicker than an upper side, and a left side face of a thick portion of the right wall 20 is positioned further to the shift lever plate 12 inside than a left side face of a thin portion of the right wall 20. As illustrated in FIG. 4, a concave portion 22 is formed at an upper end portion of the thick portion of the right wall 20. A peripheral face of the concave portion 22 curves coaxially to the supporting hole 16, and the concave portion 22 is open to the left side face of the thick portion of the right wall 20.

As illustrated in FIG. 1 and FIG. 2, a lever guide housing 32, serving as a slide section, is attached to an upper end of the shift lever plate 12. The lever guide housing 32 is equipped with a gate plate 34. The gate plate 34 is formed in a rectangular tube shape or a frame shape, and an inner portion of the gate plate 34 is open in the up-down directions. A cushion 36 is fixed to the gate plate 34 inside. A shift hole 38 is formed passing through the cushion 36, and the shift hole 38 is open in the up-down directions. An open face of the shift hole 38 is bent into a hook shape corresponding to an operating pattern of a lever main body 74 (refer to FIG. 6), described later.

Figure 3:
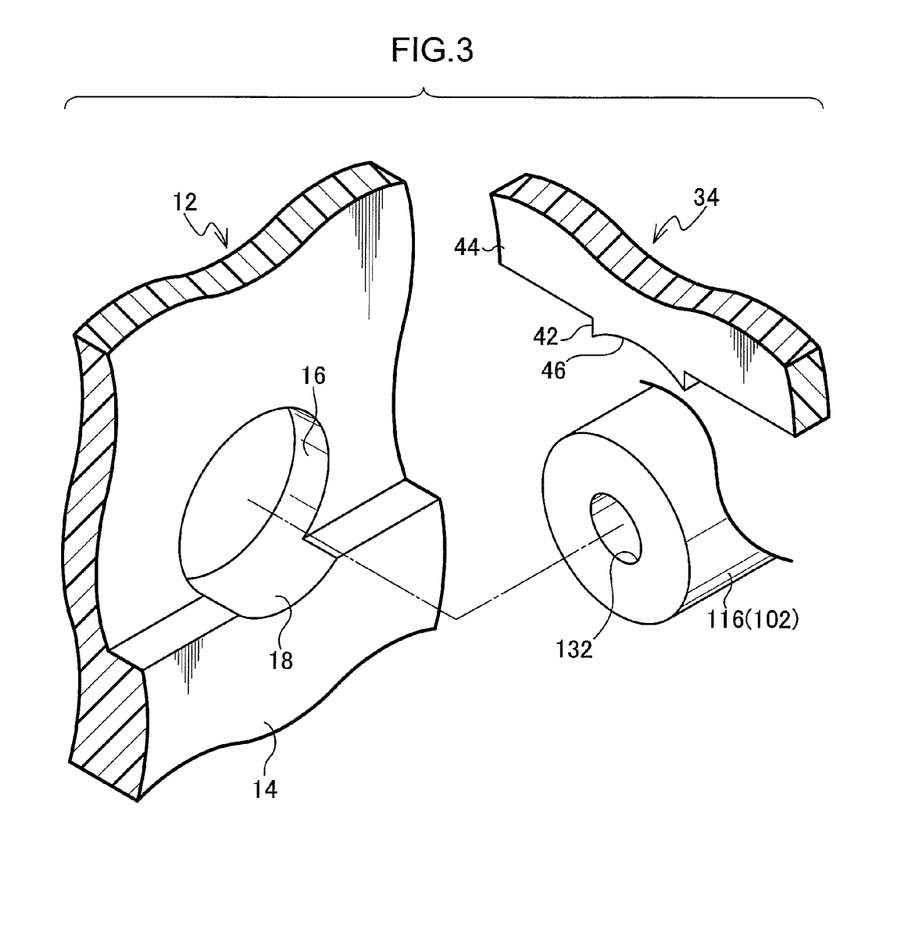
FIG. 3 is an enlarged perspective view of a supporting hole and a mounting portion.

As illustrated in FIG. 1, the gate plate 34 is equipped with a retaining tab 42, and as illustrated in FIG. 3, the retaining tab 42 extends downward from a lower end of a left wall 44 of the gate plate 34. A concave portion 46 is formed to a lower end portion of the retaining tab 42. The concave portion 46 opens downward, and a peripheral face thereof curves coaxially with respect to the supporting hole 16.

The gate plate 34 is equipped with a pressing tab 52 serving as a slide portion, and the pressing tab 52 extends downward from a lower end of a right wall 54 of the gate plate 34. As illustrated in FIG. 4, the pressing tab 52 is equipped with a retaining portion 56, and a concave portion 58 is formed at a lower end portion of the retaining portion 56. The concave portion 58 is formed as curved face that opens downward, and the radius of curvature of the concave portion 58 is set as greater than the radius of a shaft portion 154, described later.

A restricting portion 60 extends downward from a lower end portion of the retaining portion 56. The restricting portion 60 is configured thinner than the retaining portion 56, and a left side face of the restricting portion 60 is positioned further to the right side than a left face of the retaining portion 56. A pressing portion 62 extends downward from a lower end portion of the restricting portion 60. The pressing portion 62 becomes gradually thinner on progression downward, and a left side face of the pressing portion 62 is configured as an inclined face that gradually displaces to the right side on progression downward.

As illustrated in FIG. 1 and FIG. 2, the shift lever device 10 is equipped with a shift lever assembly 72 serving as an operating member. The shift lever assembly 72 is equipped with the lever main body 74. Shaft portions 76 are coaxially formed to both a front face and a rear face of the lever main body 74. However, the shaft portion 76 formed to the lever main body 74 front face is not shown in the drawings. A lower end side of a shaft 78 is inserted into, and fixed to, an upper end portion of the lever main body 74, and a knob 80 is fixed to an upper end portion of the shaft 78.

An accommodating hole 82 is formed to the lever main body 74, as illustrated in FIG. 2. The accommodating hole 82 is configured as a bottomed hole opening at a lower end portion of the lever main body 74, and an indexing pin 84 is slidably accommodated inside the accommodating hole 82. A compression coil spring 86 is provided inside the accommodating hole 82, and the indexing pin 84 is biased downward by the compression coil spring 86. An indexing plate 88 is provided below the lever main body 74. An inclined face 90 is appropriately formed at an upper face of the indexing plate 88, and the indexing pin 84 is pressed against the inclined face 90 by the biasing force of the compression coil spring 86.

The shift lever assembly 72 is equipped with a retainer 102 serving as an operating portion. The retainer 102 is formed in a rectangular tube shape opened at an upper end and a lower end, and the lever main body 74 passes through inside the retainer 102. A cutaway 108 is formed to both a front wall 104 and a rear wall 106 of the retainer 102, and the cutaways 108 open upward at an upper end of the front wall 104 and rear wall 106, respectively.

The opening width of the cutaways 108 is set as equal to, or greater than, the diameter of the shaft portions 76 of the lever main body 74, and a lower end portion of the respective cutaways 108 is curved at the same curvature as an outer periphery shape of the shaft portions 76. The shaft portions 76 enter the respective cutaways 108 from an upper end, and the shaft portions 76 contact a lower end of the cutaways 108.

A receiving tab 110 is formed to the front wall 104 and the rear wall 106, respectively, although the receiving tab 110 of the front wall 104 is not shown in the drawings. Each receiving tab 110 is formed at a lower end side of the cutaway 108, and is curved, opening upward. The radius of curvature of an inner peripheral face of the receiving tab 110 is set as equal to the radius of the shaft portions 76, and the shaft portions 76 are placed in the respective receiving tabs 110. Furthermore, a collar 112 is mounted to a leading end of both shaft portions 76. The receiving tabs 110 enter inside the respective collars 112, and the collars 112 are supported by the receiving tabs 110 so as to be capable of pivoting. The lever main body 74 is thereby capable of pivoting to the left and right about the shaft portions 76 with respect to the retainer 102.

A cylindrically shaped supporting shaft 116 is formed to a left wall 114 of the retainer 102. As illustrated in FIG. 2, the supporting shaft 116 is placed on the mounting portion 18 of the shift lever plate 12, and an outer peripheral portion of the supporting shaft 116 opposes the concave portion 46 of the retaining tab 42 of the lever guide housing 32 across a gap.

A leading end side of the supporting shaft 116 is inserted into the supporting hole 16 of the shift lever plate 12, and the supporting shaft 116 is supported by the supporting hole 16 so as to be capable of pivoting. There is a high level of precision in the dimensional relationship between the supporting hole 16 and the supporting shaft 116, and displacement of the supporting shaft 116 toward the radial direction is restricted by the fit of the supporting shaft 116 in the supporting hole 16. The retainer 102 can thereby pivot to the front and rear about the supporting shaft 116. The lever main body 74 is accordingly capable of pivoting a unit together with the retainer 102 to the front and rear about the supporting shaft 116, and to the left and right about the shaft portions 76.

Figure 6:
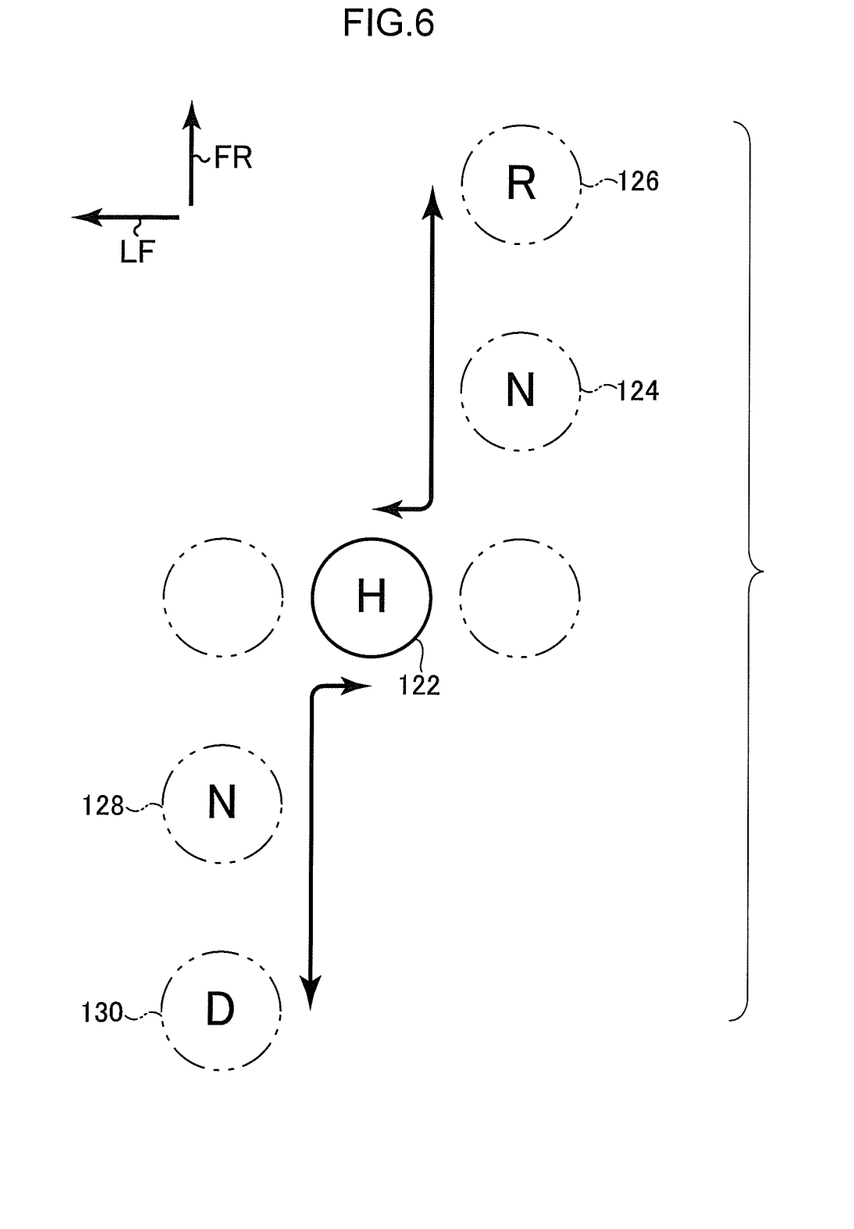
FIG. 6 is a schematic plan view for explaining an operating pattern of a shift lever device according to the exemplary embodiment of the present invention.

Thereupon, in the shift lever device 10, the lever main body 74 pivots in the front-rear direction and left-right direction along the operating pattern illustrated in FIG. 6. An automatic transmission of a vehicle is operated, as described later, when the lever main body 74 thus moves away from an H position 122 to arrive at an N position 124 or an R position 126, or at an N position 128 or a D position 130. The indexing pin 84 provided to the lever main body 74 is biased by the compression coil spring 86 and pressed against the inclined face 90 of the indexing plate 88. The indexing pin 84 thereby receives pressing reaction force from the inclined face 90 of the indexing plate 88. Thus when operating force is released in a state in which the lever main body 74 has moved away from the H position 122, the lever main body 74 returns to the H position 122 due to the reaction force that the indexing pin 84 receives from the inclined face 90.

As illustrated in FIG. 1 and FIG. 2, an fitting hole 132 is formed to the supporting shaft 116. The fitting hole 132 is coaxially formed with respect to the supporting shaft 116, and the fitting hole 132 is at least opened at a leading end of supporting shaft 116. Moreover, a magnet 134 is provided at a leading end of the supporting shaft 116, and the magnet 134 is formed in a circular plate shape, or a cylindrical shape. A protrusion 136 is formed at a right side end face of the magnet 134. The protrusion 136 is coaxially formed to the magnet 134, and the protrusion 136 is inserted into the fitting hole 132. The magnet 134 is thereby coaxially attached to the supporting shaft 116, and capable of rotating as a unit together with the supporting shaft 116.

A circuit board 138 serving as a detection section is provided at a left side of the magnet 134, and the circuit board 138 is integrally attached to the left wall 14 of the shift lever plate 12. The circuit board 138 is provided with a magnetic sensor 140 serving as a detection sensor. The magnetic sensor 140 faces the magnet 134, and a pivoting position of the magnet 134 is detected by the magnetic sensor 140. A detection signal of the magnetic sensor 140 is input to an ECU (Engine Control Unit), serving as a control section, and the automatic transmission of the vehicle is operated by the ECU. The shift range of the automatic transmission thereby changes to the shift range corresponding to the front-rear direction pivoting position of the lever main body 74.

As illustrated in FIG. 2, a cylindrically shaped shaft portion 154 is formed to a right wall 152 of the retainer 102, and the shaft portion 154 is coaxially formed with respect to the supporting shaft 116. The concave portion 22 of the right wall 20 of the shift lever plate 12 is positioned at a lower side of the shaft portion 154, and the concave portion 58 of the retaining portion 56, formed to the pressing tab 52 of the lever guide housing 32, is positioned at an upper side of the shaft portion 154. The concave portions 22, 58 each face an outer peripheral portion of the shaft portion 154 across a gap.

As a result, the shaft portion 154 is not supported by the concave portions 22, 58, and a radial direction load of the supporting shaft 116 is borne by an inner peripheral face of the supporting hole 16 when the shift lever assembly 72 is in normal operation. However, when a force is imparted to the shift lever assembly 72 that is greater than the operating force imparted to the shift lever assembly 72 during normal operation, and the shaft portion 154 is displaced, the concave portion 22 or the concave portion 58 contact the outer peripheral portion of the shaft portion 154, restricting displacement of the shaft portion 154. Displacement of the retainer 102 can thereby be restricted.

Figure 7:
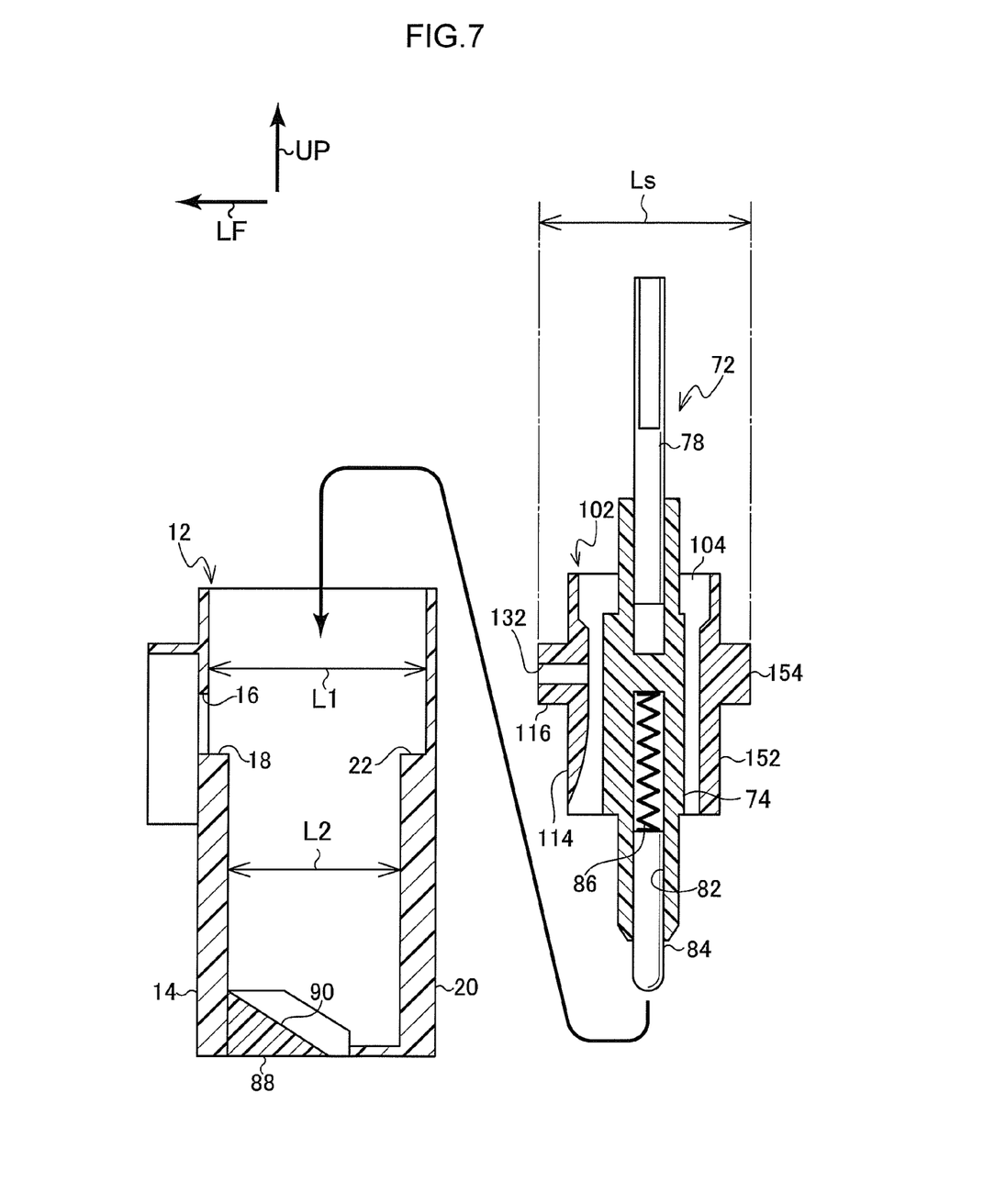
FIG. 7 is a cross-section view illustrating a state in which an operating member is disposed inside a supporting member, corresponding to FIG. 2, and explaining an assembly process of the shift lever device according to the exemplary embodiment of the present invention.

As illustrated in FIG. 7, a length Ls from a leading end of the shaft portion 154 to the leading end of the supporting shaft 116 is set as shorter than an spacing L1 between the thin portion of the left wall 14 and the thin portion of the right wall 20 of the shift lever plate 12, and is set longer than an spacing L2 between the thick portion of the left wall 14 and the thick portion of the right wall 20. As a result, the supporting shaft 116 can be mounted on the mounting portion 18 of the left wall 14, by entering the retainer 102 inside the shift lever plate 12 from an upper side of the shift lever plate 12.

Exemplary Embodiment Operation and Advantageous Effects

Explanation follows regarding operation and advantageous effects of the present exemplary embodiment, through an explanation of the assembly process of the shift lever device 10.

Figure 8:
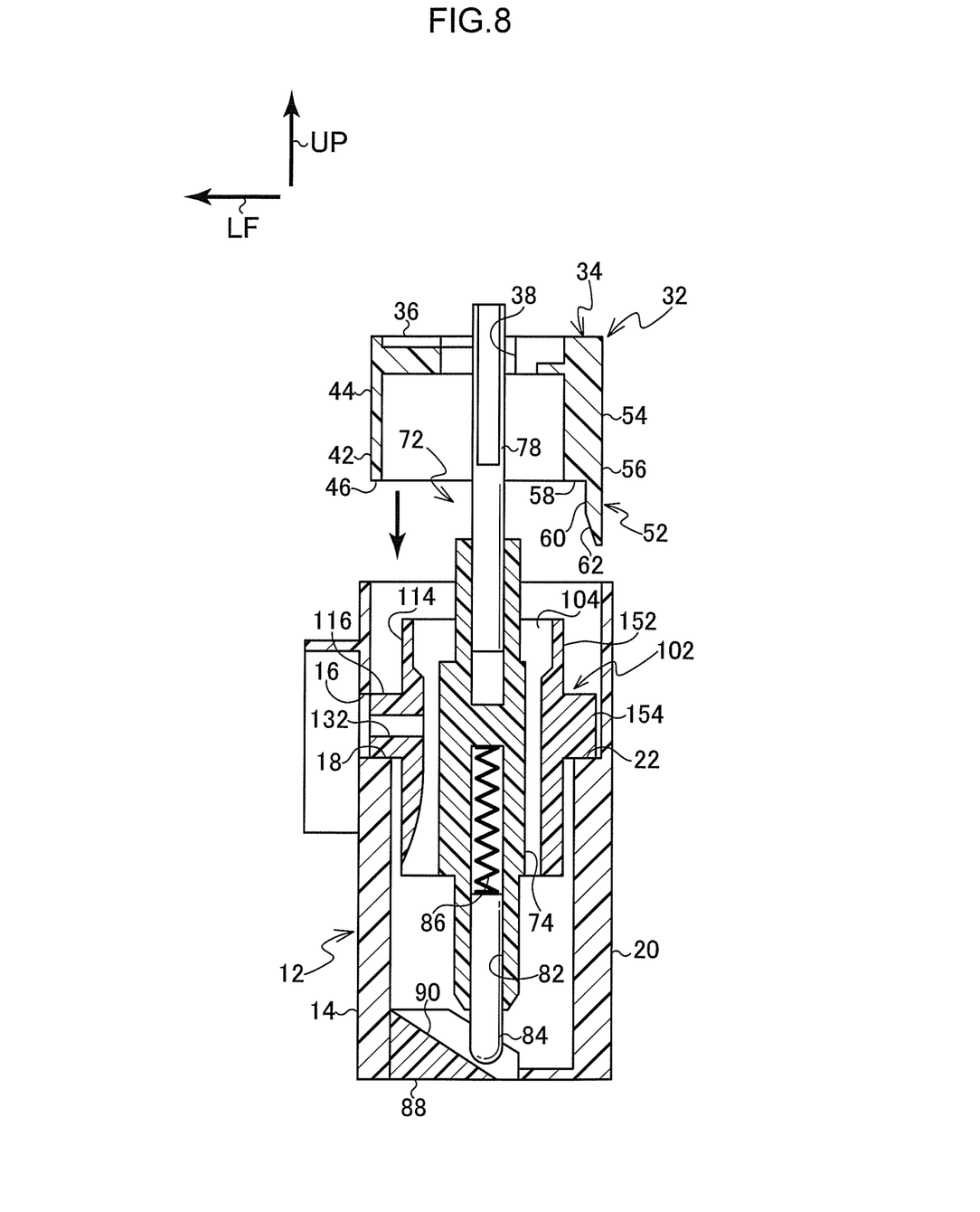
FIG. 8 is a cross-section view illustrating a state in which the operating member has been mounted to a mounting portion, corresponding to FIG. 7, and explaining the assembly process of the shift lever device according to the exemplary embodiment of the present invention.

In the shift lever device 10, the compression coil spring 86, the indexing pin 84, the shaft 78, and so on are assembled in advance to the lever main body 74 of the shift lever assembly 72. Furthermore, the lever main body 74 is assembled to the retainer 102. As illustrated in FIG. 7, the retainer 102 is provided inside the shift lever plate 12 from an upper end of the shift lever plate 12. As illustrated in FIG. 8, the supporting shaft 116 of the retainer 102 is thereby mounted from above on the mounting portion 18 of the left wall 14.

The mounting portion 18 has a curved face that is coaxial with respect to the supporting hole 16, and the radius of curvature is equal to the radius of the supporting hole 16. As a result the supporting shaft 116 disposed coaxially with respect to the supporting hole 16 when the supporting shaft 116 is mounted on the mounting portion 18. In this state, a gap, equal to, or greater than, the thickness dimensions of a leading end of the pressing portion 62 at the pressing tab 52 of the lever guide housing 32, is formed between the thin portion of the right wall 20 of the shift lever plate 12 and the shaft portion 154 of the retainer 102.

Figure 9:
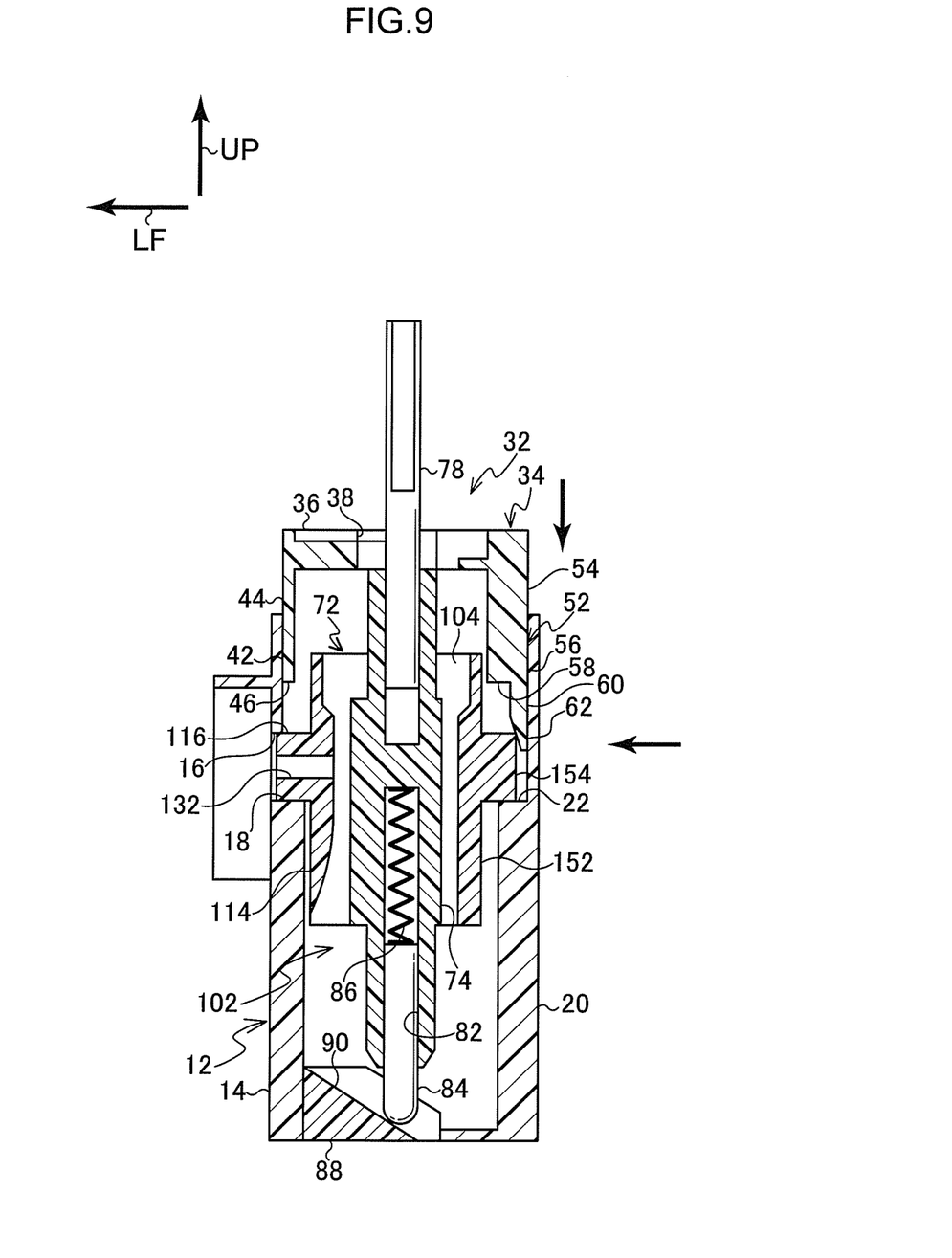
FIG. 9 is a cross-section view illustrating a state in which the operating member has been slid by a slide section, and one end of a supporting shaft has been inserted into a supporting hole, corresponding to FIG. 8, and explaining the assembly process of the shift lever device according to the exemplary embodiment of the present invention.

Next, as illustrated in FIG. 8, the gate plate 34 of the lever guide housing 32 is attached to the upper end portion of the shift lever plate 12. When this occurs, the pressing portion 62 of the pressing tab 52 enters between the thin portion of the right wall 20 and the shaft portion 154. As illustrated in FIG. 9, when the gate plate 34 is lowered further in this state, the inclined face of the pressing tab 52 presses against the shaft portion 154. The retainer 102 thereby slides to the left, and, as illustrated in FIG. 9, the leading end of the supporting shaft 116 enters the supporting hole 16.

Figure 10:
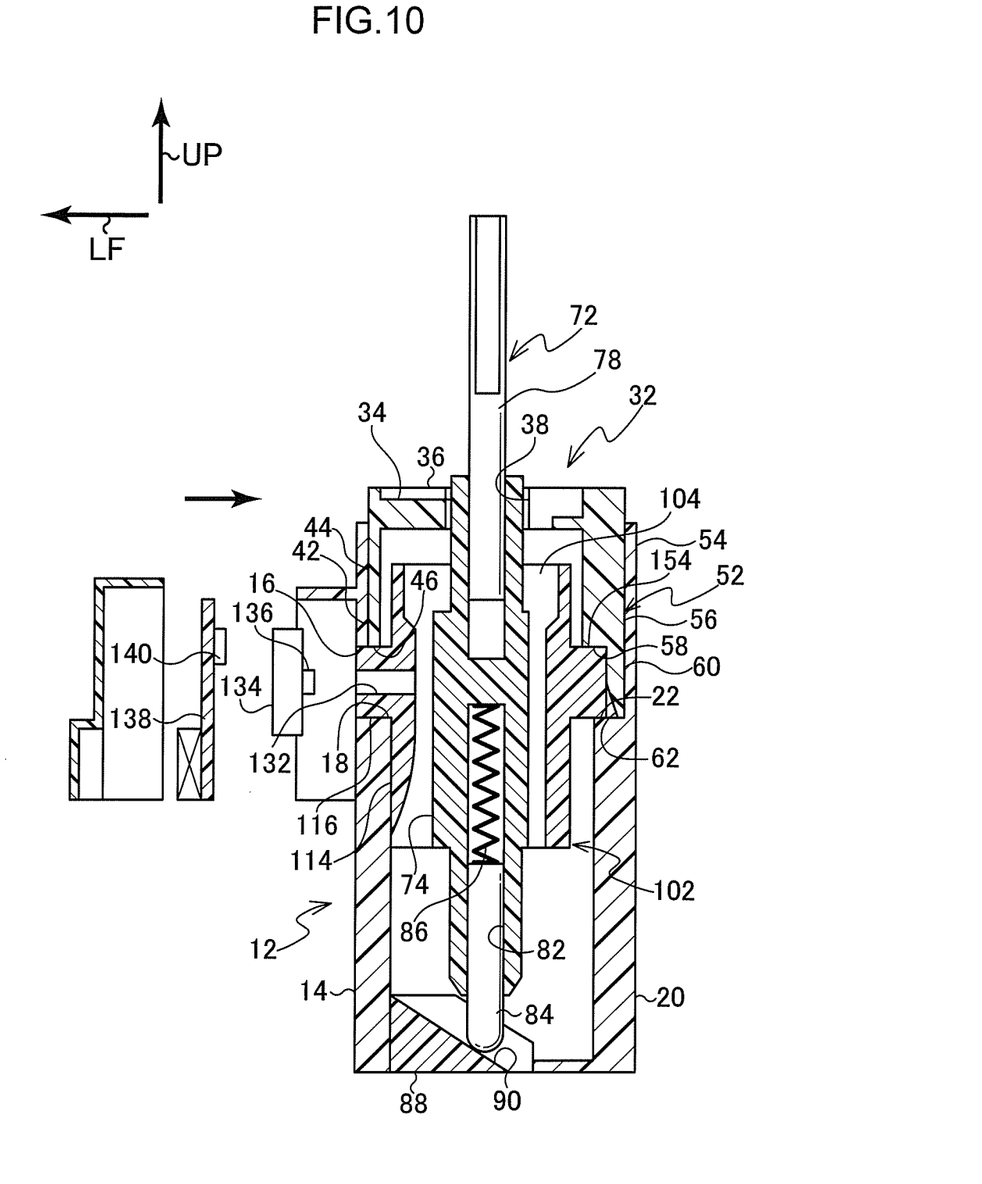
FIG. 10 is a cross-section view illustrating a state in which a detection section is assembled to the one end of the supporting shaft, corresponding to FIG. 9, and explaining the assembly process of the shift lever device according to the exemplary embodiment of the present invention.

As illustrated in FIG. 10, when the gate plate 34 is lowered to the assembly position of the shift lever plate 12, the restricting portion 60 of the pressing tab 52 enters between the shaft portion 154 and the thin portion of the right wall 20, and the left wall 114 of the retainer 102 nears the thick portion of the left wall 14 of the shift lever plate 12. Movement of the retainer 102 in the left-right direction is thereby restricted.

Next, as illustrated in FIG. 10, the protrusion 136 of the magnet 134 is inserted into the fitting hole 132 of the supporting shaft 116. The magnet 134 is thereby coaxially assembled to the supporting shaft 116. Furthermore, the circuit board 138 is integrally assembled to the left wall 14 of the shift lever plate 12. The shift lever device 10 is assembled through such processes.

Even in a configuration in which the supporting shaft 116 is formed to the retainer 102, and the supporting hole 16 is formed to the left wall 14 of the shift lever plate 12, the supporting shaft 116 can be inserted into the supporting hole 16 by sliding the retainer 102 in the supporting shaft 116 axial direction with respect to the shift lever plate 12, and the shift lever plate 12 can support the retainer 102 such that the retainer 102 is capable of pivoting. As a result, positioning accuracy of the supporting shaft 116 with respect to the retainer 102, and positioning accuracy of the supporting hole 16 with respect to the shift lever plate 12 can be increased. Positioning accuracy of the center of pivot of the retainer 102 can accordingly be enhanced.

Positioning accuracy of the center of pivot of the magnet 134 that is coaxially assembled to the supporting shaft 116 and pivots together with the retainer 102 is thereby increased. As a result, the front-rear direction pivoting position of the shift lever assembly 72 can be detected with a high degree of accuracy, enabling increased operating precision of the vehicle automatic transmission by pivoting the shift lever assembly 72.

Moreover, in the shift lever device 10, when the supporting shaft 116 is placed on the mounting portion 18 of the left wall 14, the supporting shaft 116 is coaxially disposed with respect to the supporting hole 16. As a result, the supporting shaft 116 can easily be inserted into the supporting hole 16, simply by sliding the retainer 102 to the left. Moreover, the retainer 102 slides to the left due to the shaft portion 154 being pressed by the pressing portion 62 of the pressing tab 52 of the lever guide housing 32. As a result, insertion of the supporting shaft 116 into the supporting hole 16 is further facilitated using a simple configuration in which the pressing portion 62 is provided to the lever guide housing 32.

Moreover, the concave portion 46 of the retaining tab 42 of the lever guide housing 32 is separated from the outer periphery portion of the supporting shaft 116 of the retainer 102. However, when a force is imparted to the shift lever assembly 72 that is greater than the operating force applied during normal operation, and the supporting shaft 116 is displaced in the radial direction, the concave portion 46 contacts the outer peripheral portion of the supporting shaft 116 and restricts displacement of the supporting shaft 116. Displacement of the retainer 102 can thereby be restricted.

Furthermore, when a force is imparted to the shift lever assembly 72 that is greater than the operating force applied during normal operation, and the shaft portion 154 of the retainer 102 is displaced, the concave portion 22 of the right wall 20 or the concave portion 58 of the pressing tab 52 contacts the outer peripheral portion of the shaft portion 154 and restricts displacement of the shaft portion 154. Displacement of the retainer 102 can thereby be restricted.

Note that, in the present exemplary embodiment, as described above, configuration is such that the supporting shaft 116 slides to the left and is inserted in the supporting hole 16 due to the shaft portion 154 being pressed by the pressing portion 62 of the pressing tab 52. However configuration to insert the supporting shaft 116 into the supporting hole 16 is not limited thereto.

For example, the pressing tab 52 may be configured as a separate body to the gate plate 34. Moreover, as described above, the indexing pin 84 is biased by the compression coil spring 86, and receives reaction force from the inclined face 90 of the indexing plate 88. A configuration may be employed in which, when assembling the shift lever device 10 as described above, the retainer 102 slides toward the left due to reaction force received by the indexing pin 84 from the inclined face 90 of the indexing plate 88, and the supporting shaft 116 is inserted into the supporting hole 16.

Furthermore, in the present exemplary embodiment, configuration is such that the supporting shaft 116 is inserted into the supporting hole 16 due to the shaft portion 154 being pressed by the pressing portion 62 of the pressing tab 52. However, in the state in which the supporting shaft 116 is mounted on the mounting portion 18, an operator may insert the supporting shaft 116 into the supporting hole 16 by pressing the retainer 102 and the lever main body 74 toward the left.

Moreover, in the present exemplary embodiment, configuration is such that the supporting shaft 116 is inserted into the supporting hole 16 by the retainer 102 sliding in the supporting shaft 116 axial direction. However, a configuration may also be employed in which the supporting shaft 116 is inserted into the supporting hole 16 by the shift lever plate 12 sliding in the supporting shaft 116 axial direction.

Furthermore, in the present exemplary embodiment, configuration is such that the supporting shaft 116 is formed to the retainer 102. However, providing that the supporting shaft 116 is integrally formed to the retainer 102, the supporting shaft 116 may, for example, be integrally formed to the retainer 102 by insert molding.

Moreover, in the present exemplary embodiment, configuration is such that the supporting shaft 116 is formed to the retainer 102 and the supporting hole 16 is formed to the shift lever plate 12. However, a configuration may also be employed in which the supporting shaft 116 is formed to the shift lever plate 12 and the supporting hole 16 is formed to the retainer 102.

Furthermore, in the present exemplary embodiment, configuration is such that the peripheral face of the mounting portion 18 is curved. However, it is sufficient to configure such that the supporting shaft 116 is coaxially disposed with respect to the supporting hole 16 by mounting the retainer 102 including the supporting shaft 116 to the mounting portion 18. The shape of the mounting portion 18 may therefore have a rectangular cross-section profile indented shape, or may be a V-shaped cross-section peripheral face.

Moreover, in the present exemplary embodiment, the operating pattern of the lever main body 74 configures a hook shape, as illustrated in FIG. 6. However, the operating pattern of the lever main body 74 is not limited thereto, and the operating pattern of the lever main body 74 may configure another shape, such as an H shape.

Furthermore, in the present exemplary embodiment, configuration is such that the lever main body 74 is capable of pivoting to the front, rear, left and right; however the present invention may also be applied to a shift lever device in which a shift lever only pivots in the front-rear direction or the left-right direction.

Moreover, in the present exemplary embodiment, configuration is such that the concave portion 46, formed to the retaining tab 42 of the gate plate 34 of the lever guide housing 32, faces the outer peripheral portion of the supporting shaft 116 across a gap. However the concave portion 46 may contact the outer peripheral portion of the supporting shaft 116.

Furthermore, in the present exemplary embodiment, configuration is such that the concave portion 22 formed to the right wall 20 of the shift lever plate 12 and the concave portion 58 formed to the retaining portion 56 of the pressing tab 52 of the lever guide housing 32 face the outer peripheral portion of the shaft portion 154 across a gap. However the concave portion 22 and the concave portion 58 may contact the outer peripheral portion of the shaft portion 154.

Moreover, in the present exemplary embodiment, configuration is such that the present invention is applied to the structure in which the retainer 102 is assembled to the shift lever plate 12 so as to be capable of pivoting. However, the present invention may also be applied for example to a structure in which the lever main body 74 is assembled to the retainer 102 so as to be capable of pivoting.

Furthermore, in the present exemplary embodiment, configuration is such that the front-rear direction pivoting position of the lever main body 74 is detected by detection of the rotation position of the magnet 134 using a magnetic sensor 140 provided to the circuit board 138. However, the detection section and configuration of the detection sensor are not limited to such a configuration, and, for example, another sensor such as a light sensor may be employed as the detection sensor.

Moreover, in the present exemplary embodiment, the present invention is applied to a momentary type shift device in which, when the operating force is released in a state in which the lever main body 74 is distanced from the H position 122, the lever main body 74 returns to the H position 122 due the reaction force received by the indexing pin 84 from the inclined face 90. However, the present invention may also be applied to a stationary type shift device, in which the lever main body 74 remains in the position to which it has been operated.

What is claimed is:

1. A shift device comprising:
   a supporting member that is integrally provided with one of a supporting shaft or a supporting hole;
   an operating member that is integrally provided with the other of the supporting shaft or the supporting hole, that is supported by the supporting member so as to be capable of pivoting by insertion of the supporting shaft into the supporting hole from the axial direction, and that operates a vehicle transmission by being operated, and
   a slide section including a slide portion that has both a pressing portion and a restricting portion engageable with the supporting shaft,
   wherein when the supporting shaft is pressed by the pressing portion of the slide portion, the restricting portion of the slide portion enters between the supporting shaft and the supporting member past the axis of rotation of the supporting shaft so as to restrict movement of the supporting shaft.

2. The shift device of claim 1, further comprising a detection section that detects a pivoting position of the operating member.

3. The shift device of claim 1, wherein the slide section slides one of the operating member or the supporting member in the axial direction of the supporting shaft with respect to the other of the operating member or the supporting member, such that the supporting shaft is inserted into the supporting hole.

4. The shift device of claim 2, wherein the slide section slides one of the operating member or the supporting member in the axial direction of the supporting shaft with respect to the other of the operating member or the supporting member, such that the supporting shaft is inserted into the supporting hole.

5. The shift device of claim 3, wherein, by attaching the slide section to the support member, the slide section presses and slides the operating member in the axial direction of the supporting shaft.

6. The shift device of claim 4, wherein, by attaching the slide section to the support member, the slide section presses and slides the operating member in the axial direction of the supporting shaft.

* * * * *